United States Patent
Duan et al.

(10) Patent No.: US 11,259,143 B2
(45) Date of Patent: Feb. 22, 2022

(54) METHOD AND APPARATUS FOR ASSOCIATING OR DISASSOCIATING MOBILE DEVICES

(71) Applicant: Red Point Positioning Corporation, Boston, MA (US)

(72) Inventors: Chunjie Duan, Brookline, MA (US); Yara Osko, Cambridge, MA (US); Anton Shpakovskiy, Boston, MA (US); Yuyi Wei, Boston, MA (US); Jay Sun, Natick, MA (US); Keru Xia, Malden, MA (US); Alex Tidwell, Cambridge, MA (US); Mingda Zhou, Stoneham, MA (US); Alexey Liushnia, Kharkov (UA); Dmitry Zvegincev, Kharkov (UA)

(73) Assignee: Red Point Positioning Corporation, Boston, MA (US)

( * ) Notice: Subject to any disclaimer, the term of this patent is extended or adjusted under 35 U.S.C. 154(b) by 0 days.

(21) Appl. No.: 16/937,852

(22) Filed: Jul. 24, 2020

(65) Prior Publication Data

US 2021/0029493 A1    Jan. 28, 2021

Related U.S. Application Data

(60) Provisional application No. 62/878,149, filed on Jul. 24, 2019.

(51) Int. Cl.
  *G08B 7/06* (2006.01)
  *H04W 4/02* (2018.01)

(52) U.S. Cl.
  CPC .............. *H04W 4/023* (2013.01); *G08B 7/06* (2013.01)

(58) Field of Classification Search
  CPC ..... H04W 4/023; H04W 4/024; H04W 4/027; H04W 4/029; H04W 4/44; G08B 7/06
  See application file for complete search history.

(56) References Cited

U.S. PATENT DOCUMENTS

| | | | | |
|---|---|---|---|---|
| 2010/0219939 | A1* | 9/2010 | Twitchell, Jr. | ......... G06Q 10/08 340/10.1 |
| 2011/0111726 | A1* | 5/2011 | Kholaif | ................. H04W 76/50 455/404.2 |

(Continued)

FOREIGN PATENT DOCUMENTS

WO     WO2017/196584     11/2017

OTHER PUBLICATIONS

"Amendment Under Article 34 and Response to Written Opinion", PCT/US2020/043393, 10 pages.

(Continued)

*Primary Examiner* — Qutbuddin Ghulamali
(74) *Attorney, Agent, or Firm* — Guntin & Gust, PLC; Robert Gingher

(57) ABSTRACT

Aspects of the subject disclosure may include, for example, obtaining a location of a first mobile tag, responsive to detecting a second mobile tag crossing a threshold relative to the location of the first mobile tag, determining according to an activity associated with the first mobile tag, the second mobile tag, or both whether there is an association event between the first mobile tag and the second mobile tag, and responsive to determining the activity corresponds to the association event, determining whether to associate the first mobile tag and the second mobile tag. Other embodiments are disclosed.

20 Claims, 11 Drawing Sheets

(56) References Cited

U.S. PATENT DOCUMENTS

| | | | | |
|---|---|---|---|---|
| 2012/0032796 A1* | 2/2012 | Jarrett | ................ | G08B 21/0263 |
| | | | | 340/539.11 |
| 2015/0304483 A1* | 10/2015 | Dafre ' | ............. | H04M 1/72463 |
| | | | | 455/418 |
| 2016/0044451 A1* | 2/2016 | Marth | ................... | H04W 4/029 |
| | | | | 340/8.1 |
| 2017/0347228 A1* | 11/2017 | Kerai | .................... | G01S 5/0252 |

OTHER PUBLICATIONS

"International Search Report and Written Opinion", PCTUS2020/ 043393, 12 pages.

\* cited by examiner

500

METHOD AND APPARATUS FOR ASSOCIATING OR DISASSOCIATING MOBILE DEVICES

CROSS-REFERENCE TO RELATED APPLICATION(S)

The present application claims the benefit of priority to U.S. Provisional Application No. 62/878,149 filed on Jul. 24, 2019, which is hereby incorporated herein by reference in its entirety.

FIELD OF THE DISCLOSURE

The subject disclosure relates to a method and apparatus for associating or disassociating mobile devices.

BACKGROUND

Determining location information between objects can serve multiple purposes such as predicting and mitigating collisions between objects, tracking distances between objects, enforcing distancing between objects, inventory management, or combinations thereof. Objects can include people, mobile machinery such as forklifts and robots, vehicles controlled by individuals or driverless, or other objects for which location management and/or tracking may be desirable. Location information can correspond to distances between objects, trajectory of objects, speed of objects, positions of objects, or combinations thereof.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for determining location information between a mobile tag and one or more anchors. Other embodiments are described in the subject disclosure.

Figure 1:
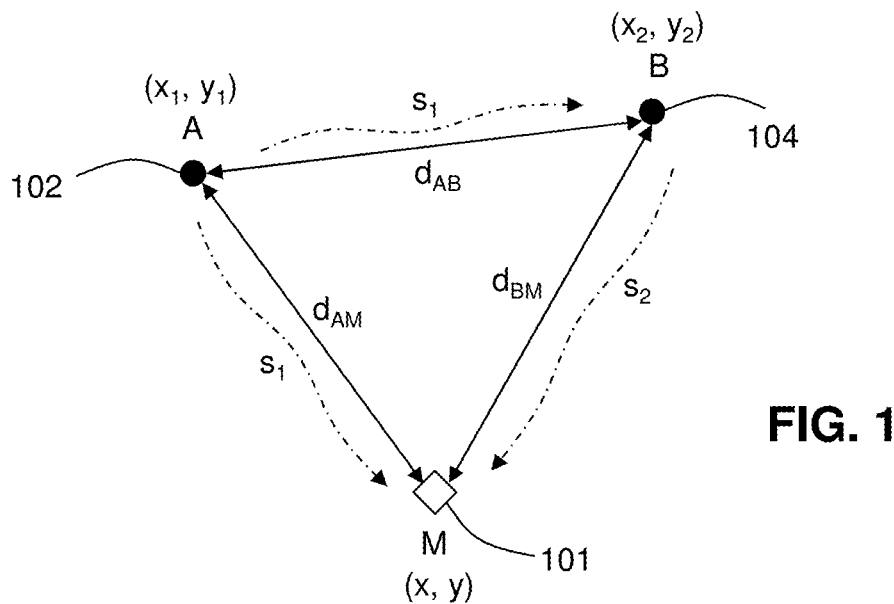
FIG. 1 is a block diagram illustrating an exemplary, non-limiting embodiment of a mobile tag and anchors for determining location information between the mobile tag and the anchors in accordance with various aspects described herein.
Figure 2:
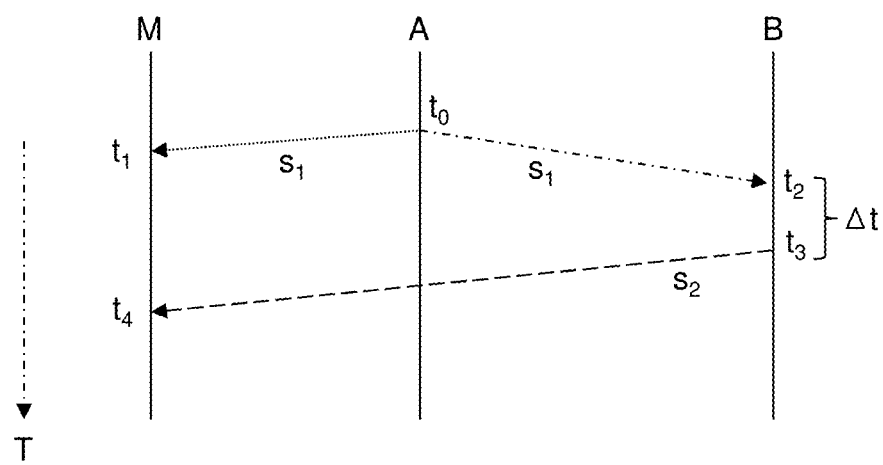
FIG. 2 is a block diagram illustrating an exemplary, non-limiting embodiment of a timing diagram for determining location information between the mobile tag and the anchors of FIG. 1 in accordance with various aspects described herein.

FIG. 1 is a block diagram illustrating an exemplary, non-limiting embodiment of a mobile tag 101 and anchors 102 ("A") and 104 ("B") for determining location information between the mobile tag 101 ("M") and the anchors 102 and 104 in accordance with various aspects described herein. In an embodiment, anchor 102 can be configured to transmit a first wireless signal ($s_1$) that can be received by anchor 104 and the mobile tag 101. The timing of transmission by anchor 102 and reception by the mobile tag 101 and anchor 104 of the first wireless signal ($s_1$) is depicted in FIG. 2.

In an embodiment, anchor 102 transmits the first wireless signal ($s_1$) at time to, which in turn is received by the mobile tag 101 at time $t_1$ and anchor 104 at time $t_2$. Anchor 104 can be configured to transmit a second wireless signal ($s_2$) at time $t_3$, which is received by the mobile tag 101 at time $t_4$. The mobile tag 101 can be configured to use a time difference of arrival (TDOA) measurement technique based on the first and second wireless signals ($s_1$, $s_2$) to determine location information between the mobile tag 101 and the anchors 102 and 104 as will be described below.

In an embodiment, anchors 102 and 104 are stationary. Accordingly, their x-y coordinates and the distance between anchors 102 and 104 ($d_{AB}$) can be made known to the mobile tag 101 either by a look-up table provisioned into a memory of the mobile tag 101 or by including such information in the first wireless signal ($s_1$), which can then be obtained by the mobile tag 101. Additionally, the mobile tag 101 can be configured to include in its look-up table the receive time and transmit time ($t_2$, $t_3$) of anchor 104 and/or a time difference between these times ($\Delta t = t_3 - t_2$), or can receive this information in the second wireless signal ($s_2$) transmitted by anchor 104. The equations that follow can be used to calculate a first possible location of the mobile tag 101 relative to anchor pairs 102, 104.

The distance between anchor 102 and the mobile tag can be represented as, $$d_{AM} = c(t_1 - t_0) \qquad \text{(EQ 1)},$$

where c is the speed of light constant. Similarly, the distance from anchor 102 to anchor 104 can be represented as, $$d_{AB}=c(t_2-t_0) \quad \text{(EQ 2).}$$

Additionally, the distance from anchor 104 to the mobile tag 101 can be represented as, $$d_{BM}=c(t_4-t_3) \quad \text{(EQ 3).}$$

The total distance traveled by the first wireless signal ($s_1$) from anchor 102 to anchor 104 and the second wireless signals ($s_2$) from anchor 104 to mobile tag 101 can be represented as, $$d_{AB}+d_{BM}=c(t_2-t_0+t_4-t_3) \quad \text{(EQ 4A).}$$

To eliminate variable $t_0$, equation EQ1 can be subtracted from equation EQ 4A, resulting in, $$d_{AB}+d_{BM}-d_{AM}=c(t_2-t_1+t_4-t_3) \quad \text{(EQ 4B).}$$

Substituting $\Delta t=t_3-t_2$ into EQ 4B results in equation, $$d_{AB}+d_{BM}-d_{AM}=c(t_4-t_1-\Delta t) \quad \text{(EQ 4C).}$$

Since $d_{AB}$ is a constant known to the mobile tag 101 and the time variables of the factor $c(t_4-t_1-\Delta t)$ are also known to the mobile tag 101, EQ 4C can be rewritten as, $$d_{BM}-d_{AM}=\Delta d_1 \quad \text{(EQ 5),}$$

where $\Delta d_1=(t_4-t_1-\Delta t)-d_{AB}$, which are constants known to mobile tag 101. Furthermore, in an example of two-dimensional (2D) space, the distance between anchor 102 and the mobile tag 101 can be represented as, $$d_{AM}=\sqrt{(x-x_1)^2+(y-y_1)^2},$$

and the distance between anchor 104 and the mobile tag 101 can be represented as, $$d_{BM}=\sqrt{(x-x_2)^2+(y-y_2)^2}.$$

Substituting $d_{AM}$ and $d_{BM}$ in EQ 5 results in the following equation, $$\sqrt{(x-x_2)^2+(y-y_2)^2}-\sqrt{(x-x_1)^2+(y-y_1)^2}=\Delta d_1 \quad \text{(EQ 6).}$$

Figure 3:
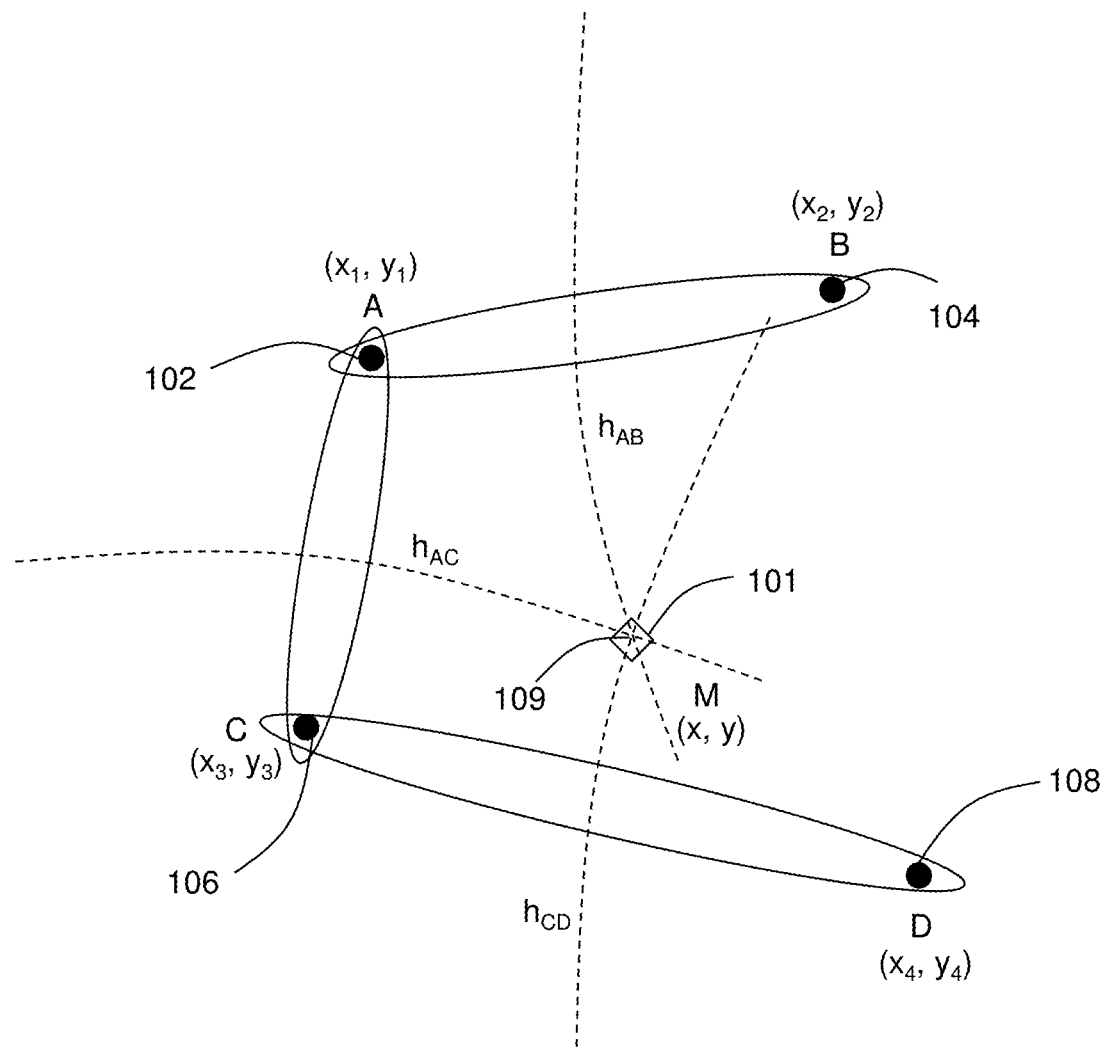
FIG. 3 is a block diagram illustrating an exemplary, non-limiting embodiment for determining location information between the mobile tag and pairs of anchors in accordance with various aspects described herein.

Equation EQ 6 has only two unknown variables (x, y) that can be solved by the mobile tag 101 utilizing a non-linear regression technique (e.g., Nonlinear Least Squares). Such a technique produces a hyperbolic curve of solutions for x and y that is associated with the positions of anchors pairs 102, 104. Such a hyperbolic curve can be represented as, $$h_{AB}=\Delta d_1 \quad \text{(EQ 7A),}$$

where $h_{AB}=\sqrt{(x-x_2)^2+(y-y_2)^2}-\sqrt{(x-x_1)^2+(y-y_1)^2}$. The mobile tag 101 can be further configured to perform the above calculation across other anchor pairs as depicted in FIG. 3. For example, the mobile tag 101 can be configured to determine a hyperbolic curve between anchors 102 and 106 (i.e., anchors A and C) resulting in equation, $$h_{AC}=\Delta d_2 \quad \text{(EQ 7B),}$$

where $\Delta d_2$ is a constant known to mobile tag 101, and where $h_{AC}=\sqrt{(x-x_3)^2+(y-y_3)^2}-\sqrt{(x-x_1)^2+(y-y_1)^2}$. Additionally, the mobile tag 101 can be configured to determine a hyperbolic curve between anchors 106 and 108 (i.e., anchors C and D) resulting in equation, $$h_{CD}=\Delta d_3 \quad \text{(EQ 7C),}$$

where $\Delta d_3$ is a constant known to mobile tag 101, and where $h_{CD}=\sqrt{(x-x_4)^2+(y-y_4)^2}-\sqrt{(x-x_3)^2+(y-y_3)^2}$. The intersection 109 of hyperbolic curves $h_{AB}$, $h_{AC}$ and $h_{CB}$ corresponding to equations EQ 7A-7C can provide a two-dimensional coordinate location (i.e., x, y) for the mobile tag 101 relative to anchors pairs 102 and 104 (anchors A/B), 106 and 108 (anchors A/C), 106 and 108 (anchors C/D). It will be appreciated that the mobile tag 101 can also be configured to determine a three-dimensional coordinate (i.e., x, y, z) of its location by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of anchor 102 (anchor "A") is defined by reference 110, while the coverage area of anchor 104 (anchor "B") is defined by reference 112. The overlapping region 114 represents the coverage area that is jointly shared by anchors 102 and 104. Since anchor 104 and the mobile tag 101 must be able to receive the first wireless signal ($s_1$) generated by anchor 102, anchors 104 and the mobile tag 101 must be located in the overlapping region 114. Additionally, the mobile tag 101 must be in the overlapping region 114 in order to receive the second wireless signal ($s_2$) generated by anchor 104. Conditions such as described above for anchor pairs 102, 104 (anchors A/B) must also be satisfied by the other anchor pairs 102, 106 (anchors A/C) and anchor pairs 106, 108 (anchors C/D) in order to enable the mobile tag 101 to perform the triangulation calculations described above for hyperbolic curves $h_{AB}$, $h_{AC}$ and $h_{CD}$.

Figure 4A:
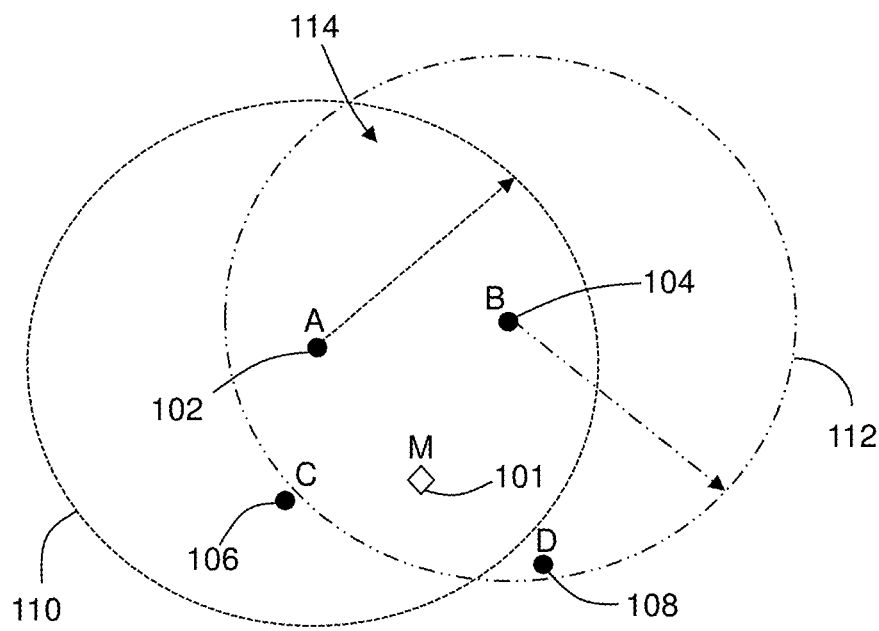
FIGS. 4A, 4B and 4C are block diagrams illustrating exemplary, non-limiting embodiments for selecting pairs of anchors in accordance with various aspects described herein.
Figure 4B:
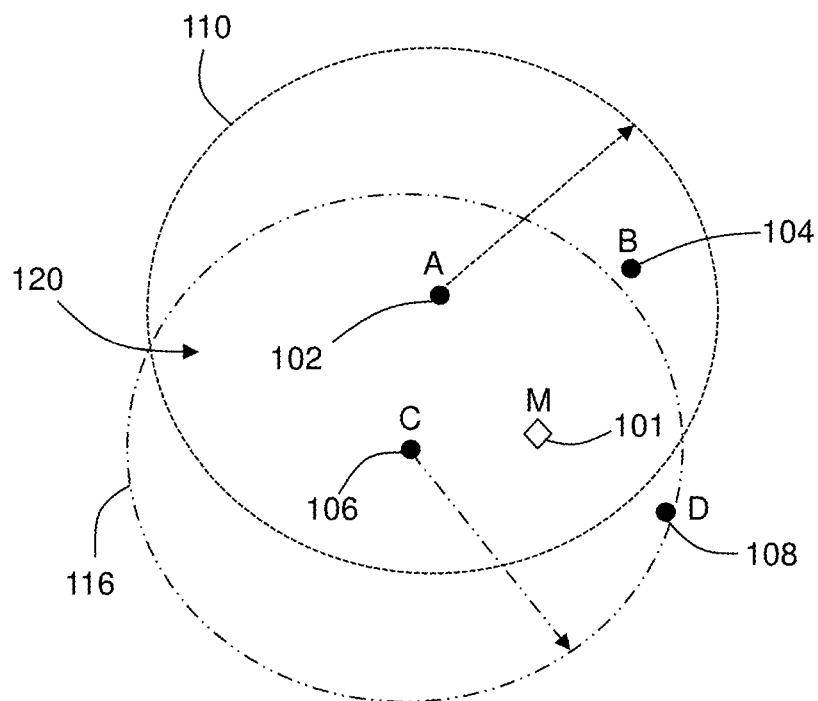
Figure 4C:
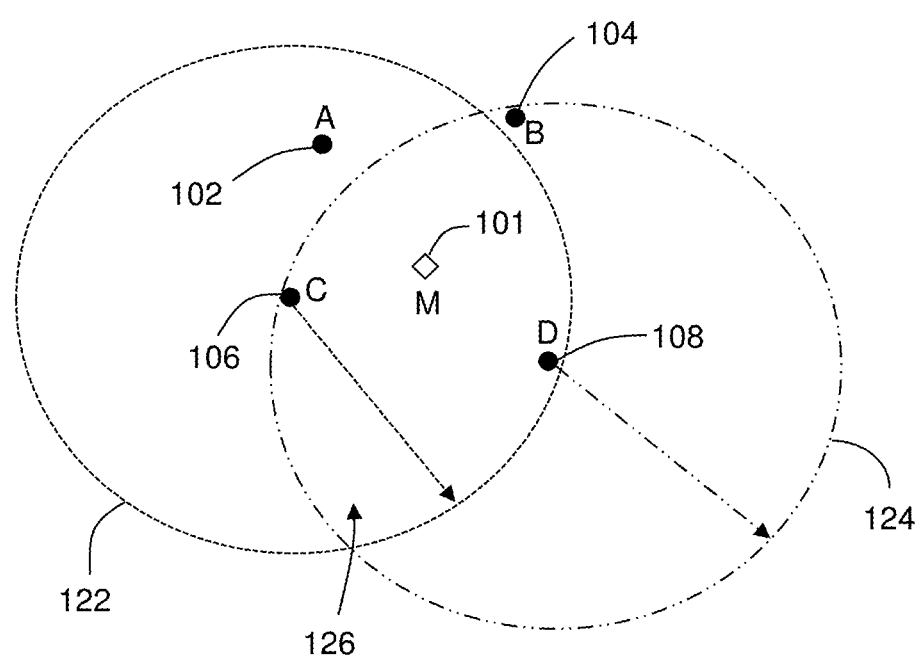

FIG. 4B shows that the coverage areas 110 and 116 of anchor pairs 102, 106 (anchors A/C), respectively, creates an overlapping region 120 that encompasses anchors 102 and 106 and the mobile tag 101, thereby enabling the mobile tag 101 to calculate hyperbolic curve $h_{AC}$. Additionally, FIG. 4C shows that the coverage areas 122 and 124 of anchor pairs 106, 108 (anchors C/D), respectively, creates an overlapping region 126 that encompasses anchors 106 and 108 and the mobile tag 101, thereby enabling the mobile tag 101 to calculate hyperbolic curve $h_{CD}$.

Figure 5:
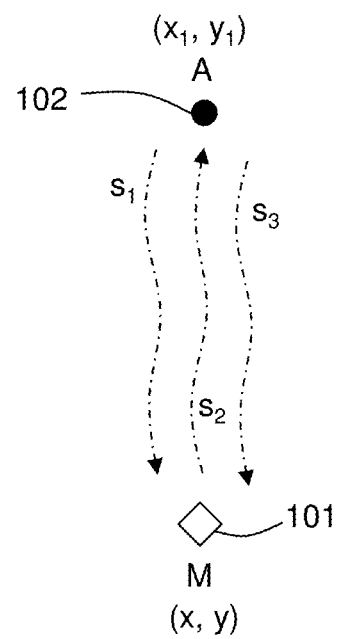
FIG. 5 is a block diagram illustrating an exemplary, non-limiting embodiment of a mobile tag and an anchor for determining location information between the mobile tag and the anchor in accordance with various aspects described herein.
Figure 6:
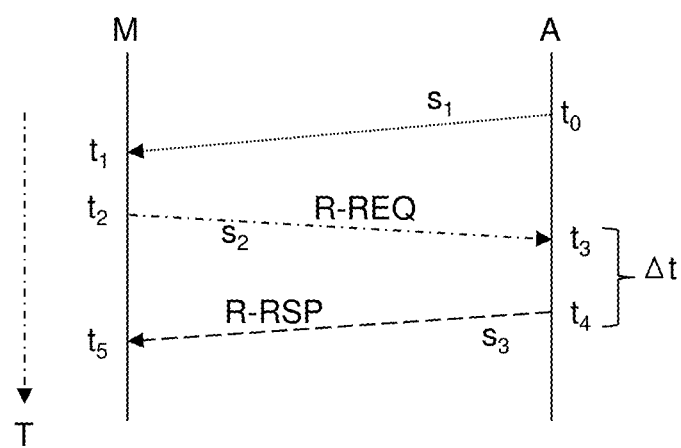
FIG. 6 is a block diagram illustrating an exemplary, non-limiting embodiment of a timing diagram for determining location information between the mobile tag and the anchor of FIG. 5 in accordance with various aspects described herein.

FIG. 5 depicts another embodiment for determining location information between the mobile tag 101 and an anchor 102. In this embodiment, the mobile tag 101 can be configured to use a two-way time of arrival (TW-TOA) process for determining a distance between itself and the anchor 102. Optionally, the process may begin at anchor 102 which transmits a first wireless signal ($s_1$), which is received at time $t_1$. Wireless signal ($s_1$) can include the x-y coordinates ($x_1$, $y_1$) of anchor 102. Upon receiving the first wireless signal ($s_1$), the mobile tag 101 can be configured to transmit a second wireless signal ($s_2$), which can represent a range request (R-REQ) signal directed to anchor 102 initiated at time $t_2$ and received by anchor 102 at time $t_3$.

Upon receiving the R-REQ signal at time $t_3$, the anchor 102 can process the R-REQ signal and initiate at time $t_4$ a transmission of a third wireless signal ($s_3$) representing a range response (R-RSP) signal that is received by the mobile tag 101 at time $t_5$. The time to process the R-REQ signal and transmit the R-RSP signal can be represented by $\Delta t=t_4-t_3$, which can be communicated to the mobile tag 101 via the third wireless signal ($s_3$).

The mobile tag 101 can be configured to determine a roundtrip distance based on the formula, $$d_{r\text{-}trip}=d_{AM}+d_{MA},$$

where $d_{r\text{-}trip}$ is the roundtrip distance from the mobile tag 101 to anchor 102 and back to mobile tag 101, $d_{MA}$ is the distance from the mobile tag 101 to anchor 102, and $d_{AM}$ is the distance from anchor 102 to the mobile tag 101. The distance from the mobile tag 101 to anchor 102 can be determined by, $$d_{MA}=c(t_3-t_2).$$

Similarly, the distance from anchor 102 to the mobile tag 101 can be determined by, $$d_{AM}=c(t_5-t_4).$$

With the above equations, the roundtrip distance can be rewritten as, $$d_{r\text{-}trip}=c(t_5-t_4+t_3-t_2).$$

As noted earlier, the time to process the R-REQ signal and transmit the R-RSP signal via anchor 102 can be represented as $\Delta t = t_4 - t_3$. Anchor 102 can be configured to transmit the value of $\Delta t$ in the R-RSP signal for use by the mobile tag 101 in calculating $d_{r\text{-}trip}$. Substituting $\Delta t$ in $d_{r\text{-}trip}$ results in the formula, $$d\text{r-trip}=c(t_5-t_2-\Delta t).$$

Since the values of $t_5$, $t_2$, and $\Delta t$ are known to the mobile tag 101, the mobile tag 101 can readily calculate $d_{r\text{-}trip}$. The mobile tag 101 can also calculate the distance from the mobile tag 101 to anchor 102 based on the formula, $$d_{MA}=d_{r\text{-}trip}/2.$$

It will be appreciated that the mobile tag 101 can also be configured to know a priori the fixed value of $\Delta t$ thus eliminating the need to transmit the value of $\Delta t$ in the R-RSP signal. This knowledge can be based on a pre-provisioning of the mobile tag 101 with this information prior to deployment. In yet another embodiment, the processing time to receive the R-REQ signal and respond with the transmission of the R-RSP signal can be a fixed processing time interval known and used by all devices in a network performing TW-TOA analysis. It will be further appreciated that the R-REQ and the R-RSP signals can be transmitted using ultra-wideband signaling technology to increase the accuracy of the $d_{r\text{-}trip}$ calculations. Accordingly, the TW-TOA illustrated in FIG. 5 can be used by either the mobile tag 101 or anchors in other embodiments to calculate a relative distance between each other.

It will be appreciated that the TDOA and TW-TOA processes described above can also between mobile tags 101. For example, FIGS. 1-3, 4A-4C, and 5-6 can be adapted so that the anchors are replaced with mobile tags 101. In this embodiment, mobile tags 101 can use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, 5, can be configured with multiple antennas and phase detectors to calculate an angle of arrival of any wireless signal generated by an anchor and received by the mobile tag 101 based on a phase difference between the antennas determined from the received wireless signal. An angle of arrival calculation can be used to determine an angular orientation between a mobile tag 101 and an anchor. It will be further appreciated that the mobile tags 101 can be configured to determine a speed of travel of the mobile tag 101 by performing multiple location measurements over a time period. With angular orientation and speed of travel, a mobile tag 101 can also determine its trajectory of travel. Alternatively, the mobile tags 101 can be configured with an orientation sensor (e.g., a magnetometer) to determine an angular orientation with an anchor.

Figure 7:
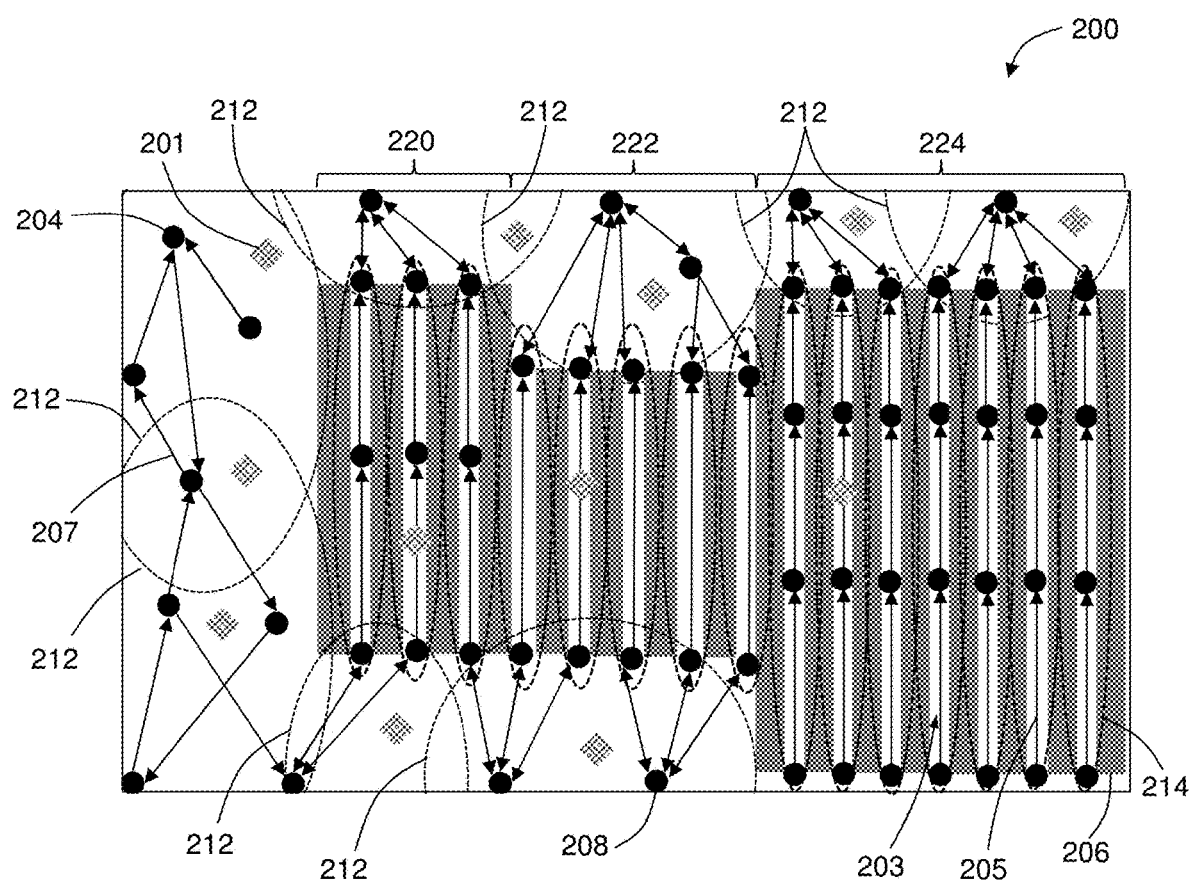
FIG. 7 is a block diagram illustrating an exemplary, non-limiting embodiment for determining location information between mobile tags and the stationary anchors in a demarcated area in accordance with various aspects described herein.

As will be discussed shortly, TDOA, TW-TOA, angular orientation, speed of travel, or combinations thereof can be utilized in an environment such as illustrated in FIG. 7.

FIG. 7 is a block diagram illustrating an exemplary, non-limiting embodiment for determining location information of mobile tags 201 in a demarcated area 200 in accordance with various aspects described herein. In the illustration of FIG. 7, the demarcated area 200 can represent a warehouse with racks or shelves 206 for managing the distribution of products and/or materials. It will be appreciated that the demarcated area 200 can correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications for which the subject disclosure can be applied to. For illustration purposes only, the demarcated area 200 of FIG. 7 will be considered a warehouse with racks and/or shelves 206.

The measurement technique used by the mobile tags 201 to determine location information within the demarcated area 200 can depend on the location of the mobile tags 201 relative to other anchors 204 in the demarcated area 200. For example, when a mobile tag 201 is located in sections 212 (i.e., open spaces without shelving 206 and line-of-site to pairs of anchors 204), the mobile tag 201 can be configured to perform TDOA measurements among pairs of anchors 204 as described above in relation to FIGS. 1, 2, 3, 4A, 4B, 4C. On the other hand, when the mobile tag 201 is located in an aisle 203 between racks/shelves 206, the mobile tag 201 can be configured to perform TW-TOA measurements among one or more anchors 204 located in the aisle 203 as described above in relation to FIGS. 5-6.

Additionally, an aisle 203 can be configured with two or more anchors 204. An aisle 203 can have more than two anchors 204 when the coverage area of a first anchor 204 at one end of the aisle 203 has insufficient coverage to reach a second anchor 204 at the other end of the aisle 203 and vice-versa—see sections 220 and 224. However, when the coverage area of a first anchor 204 at one end of the aisle 203 has sufficient coverage to reach a second anchor 204 at the end of the aisle 203 and vice-versa, then no more than two anchors 204 is necessary in the aisle 203—see region 222.

Figure 8:
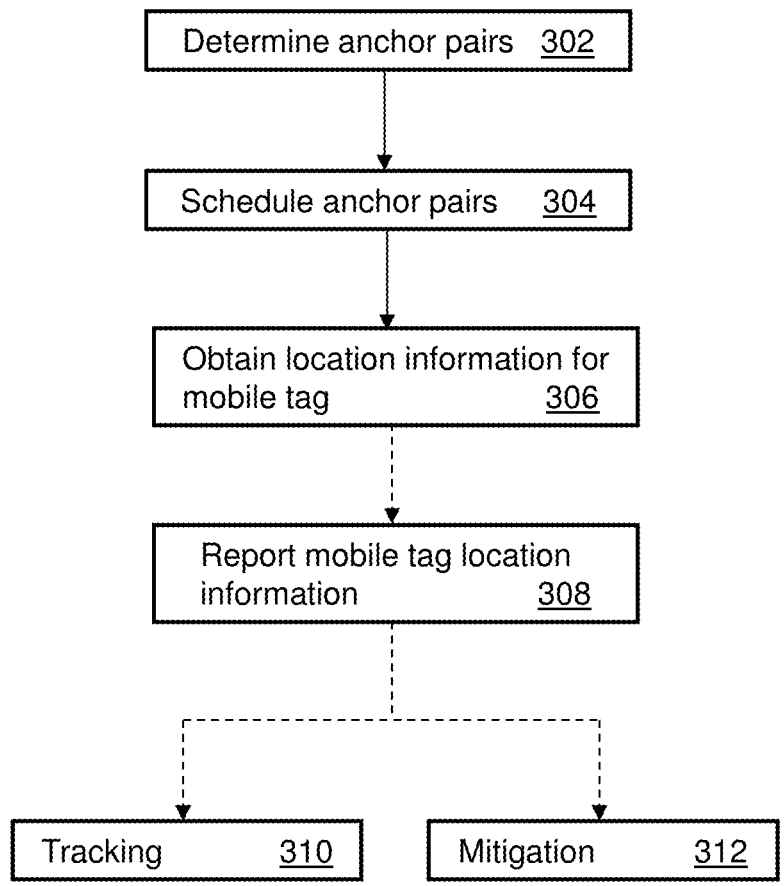
FIG. 8 depicts an illustrative embodiment of a method for determining location information and uses thereof in accordance with various aspects described herein.

FIG. 8 depicts an illustrative embodiment of a method 300 in accordance with various aspects described herein. Method 300 can begin at step 302 where a computing system such as a server (described below in relation to FIG. 11) is configured to identify anchor pairs in the demarcated area 200 of FIG. 7 that provide sufficient coverage to enable TW-TOA or TDOA measurements depending on the location of the mobile tags 201.

In the case of open spaces, like region 212 (repeated in several portions of the demarcated area 200 of FIG. 7), mobile tags 201 are configured to use TDOA measurement techniques to determine location information. To enable TDOA measurements, the server is configured at step 302 to identify, for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It will be appreciated that other techniques other than digitization of an open space can be used to identify possible x-y coordinates used by the server to perform step 302. In the case of spaces formed by aisles 203, like region 214 (repeated in several portions of the demarcated area 200 of FIG. 7), mobile tags 201 are configured to use TW-TOA measurement techniques to determine location information.

To enable TW-TOA measurements, the server is configured at step 302 to identify at least two anchors 204 covering at least a portion of the aisle 203. The mobile tags 201 can be configured to perform TW-TOA with anchors 204 at opposite ends of an aisle 203 to provide further accuracy or at least validate location information determined by the mobile tag 201. As noted earlier, pairs of anchors 204 can be located at opposite ends of an aisle 203, or in between aisles 203 when a pair of anchors 204 is unable to cover for the full-length of an aisle 203. The mobile tag 201 can be configured to perform TW-TOA measurement according to the embodiments described above in relation to FIGS. 5-6.

For open spaces such as region 212, a server can be configured at step 302 to determine optimal pairs of anchors 204 in FIG. 7 that provide sufficient coverage for any mobile tag 201 in the area such as region 212 to perform triangulation with at least three pairs of anchors 204 that satisfy the conditions set forth in FIGS. 4A-4C. The process of selecting anchor pairs for TDOA triangulation and optimal coverage in open spaces defined by region 212 can be performed as an iterative analysis by a server at step 302, or by other techniques that enable convergence to a solution that provides coverage to mobile tags 201 across most (if not all) open spaces depicted by region 212. In the case of spaces defined by aisles 203, the server can identify the anchor pairs 204 in the aisles 203 that provide sufficient coverage to cover the aisle from end-to-end as illustrated by sections 220-224 of FIG. 7.

Figure 9:
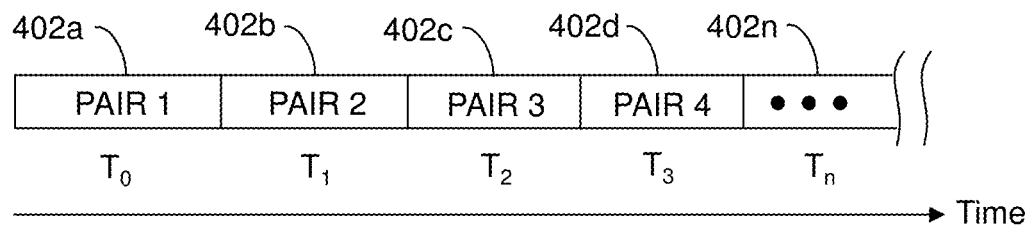
FIG. 9 is a block diagram illustrating an exemplary, non-limiting embodiment for scheduling a process for determining location information between mobile tags and pairs of anchors in the demarcated area of FIG. 7 in accordance with various aspects described herein.

Once the anchor pairs 204 have been identified, the server can proceed to step 304 to identify a schedule for communications between anchor pairs 204 and one or more mobile tags 201. In one embodiment, the anchors 204 can be configured to transmit and receive wireless signals in a single frequency band. A single frequency band for performing TDOA or TW-TOA measurements can reduce the design complexity of mobile tags 201 and corresponding costs. To avoid collisions between anchor pairs 204 transmitting in a same frequency band near other anchors, the server can be configured to utilize a time-division scheme (timeslots) such as shown in FIG. 9 to enable anchor pairs 204 to communicate with each other and with one or more mobile tags 201 without causing signal interference (i.e., wireless collisions).

To achieve this, the server can be configured, for example, to determine at step 304 which anchor pairs 204 have overlapping coverage areas with other anchor pairs and schedule the communications between the anchor pairs and the mobile tags 201 during specific timeslots $T_0$-$T_n$ (e.g., 402a through 402n). In the case where a pair of anchors 204 does not have an overlapping coverage area with another anchor pair (e.g., anchor pairs at opposite ends of the demarcated area 200), the server can schedule simultaneous wireless communications of both anchor pairs 204 during a same timeslot (not shown in FIG. 9). As part of the scheduling process shown in FIG. 9, the server can be further configured at step 304 to determine which of the anchor pairs 204 will initiate/start a measurement session through a transmission of wireless signal ($s_1$). Such anchors 204 will be referred to herein as source anchors 204.

In one embodiment, the anchor pairs 204 identified by the server at step 302, and the transmission schedule and source anchors 204 determined by the server at step 304 can be communicated to all anchors 204 via gateway anchors 208 communicatively coupled to the server. Gateway anchors 204 can be located at the edges of the demarcated area 200 or in other locations of the demarcated area 200. Additionally, the server can also be configured to share the identification of the anchor pairs 204 and transmission schedules with the mobile tags 201. This information can be conveyed by gateway anchors 208 when the mobile tags 201 are in close vicinity thereto, or by way of other anchors 204 which can be configured to obtain this information from the gateway anchors 208 and relay the information to the mobile tags 201.

It will be appreciated that the locations of the anchors 204 in FIG. 7 can be predefined before the implementation of step 302 by the server. That is, the anchors 204 can be placed by one or more individuals managing the placement of shelves/racks, etc. in the demarcated area 200. The specific x-y coordinate locations of the anchors 204 can be determined by such individuals and communicated to the server via, for example, a look-up table provided to the server, in order to perform step 302.

It will be further appreciated that in other embodiments, the location of anchors can instead be determined by the server at step 302. In this embodiment, the server can be provided with the location of racks/shelves and/or other objects in the demarcated area 200 along with dimensions of the demarcated area 200 and dimensions of the racks/shelves and/or other objects. The server can then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server can be configured to report the x-y coordinate locations of anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server can be configured to provide the x-y coordinates to all anchors 204 in the demarcated area 200 via gateway anchors 208 as described above. This information can also be conveyed by gateway anchors 208 when the mobile tags 201 are in close vicinity thereto, or by way of other anchors 204 which can be configured to obtain this information from the gateway anchors 208 and relay the information to the mobile tags 201.

Referring back to FIG. 8, at step 306, mobile tags 201 can be configured to initiate a process using TDOA or TW-TOA (and in some instances angular orientation measurements) to obtain location information depending on the location of the mobile tag 201 in the demarcated area 200. To assist mobile tags 201 in identifying whether they are in region 212 (i.e., open spaces) or region 214 (i.e., aisles 203), the source anchors 204 can be configured to transmit in the first wireless signal ($s_1$) an indication whether to use TDOA or TW-TOA. The indication may be a flag or message that enables the mobile tag 201 to determine whether it is in region 212 (an open space) or region 214 (an aisle 203). The first wireless signal ($s_1$) can also convey to the mobile tag 201 the x-y coordinates of one or both anchor pairs 204. Alternatively, the mobile tags 201 can be configured with a look-up table that includes the x-y coordinates of all anchors 204 in the demarcated area 200. The mobile tags 201 can obtain the lookup-table from the server via the gateway anchors 208 or during provisioning of the mobile tag 201 by a user before the mobile tag 201 is deployed for use in the demarcated area 200. It will be further appreciated that step 306 can be adapted to enable mobile tags 101 to measure and thereby obtain location information between each other using TDOA or TW-TOA as described earlier in relation to FIGS. 1-3, 4A-4C, and 5-6.

Once a mobile tag 201 calculates location information via TDOA or TW-TOA measurement techniques, the mobile tag 201 can in turn report at step 308 the location information to other devices such as other mobile tags 201, the anchors 204 in its coverage area, and/or the server by communicating directly to one or more gateway anchors 208 or indirectly via one or more intermediate anchors 204 that can communicate with the one or more gateway anchors 208. The location information can include without limitation, x-y coordinates of the mobile tag 201 within the demarcated area 200, a speed of travel of the mobile tag 201 determined from multiple location measurements over a time period, a trajectory of the mobile tag 201, angular orientation of the mobile tag 201 relative to other anchors 204 and/or other mobile tags 201, or any combinations thereof. Since sharing location information does not require precision measurements via ultra-wideband signals, the mobile tags 201 can be configured to share location information with other devices using lower power wireless signaling techniques such as Bluetooth®, ZigBee®, WiFi or other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 can be configured to detect issues such as proximity violations and/or possible collisions between mobile tags 201 from this shared information. Upon detecting such issues, the mobile tags 201 can be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual or otherwise carried by the individual via other suitable methods for carrying the mobile tag 201.

It will be appreciated that method 300 can be adapted for other embodiments contemplated by the subject disclosure. For example, at step 306, a mobile tag 201 can be adapted to obtain location information based on a determination whether it is in an open space defined by region 212 or an aisle 203 defined by region 214. A mobile tag 201, for example, can receive wireless signals from both an anchor 204 in an open space and an anchor 204 in an aisle 203. To determine whether to perform a TDOA measurement or a TW-TOA measurement, the mobile tag 201 can be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it can proceed to perform TDOA analysis based on the wireless signals generated by anchor pairs 204 in the open space. Otherwise, if the mobile tag 201 determines it is likely in an aisle, region 214, it can proceed to perform TW-TOA analysis based on the wireless signals generated by anchor pairs 204 in the aisle 203. If the mobile tag 201 is unable to make a determination where it is likely located from a history of locations, the mobile tag 201 can be configured to perform TDOA analysis based on the wireless signals generated by anchor pairs 204 in the open space and TW-TOA analysis based on the wireless signals generated by anchor pairs 204 in the aisle 203. The mobile tag 201 can be configured to compare the location determined from TDOA and the location determined from TW-TOA to the stored location history and thereby make a determination as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 can be optional.

Figure 10:
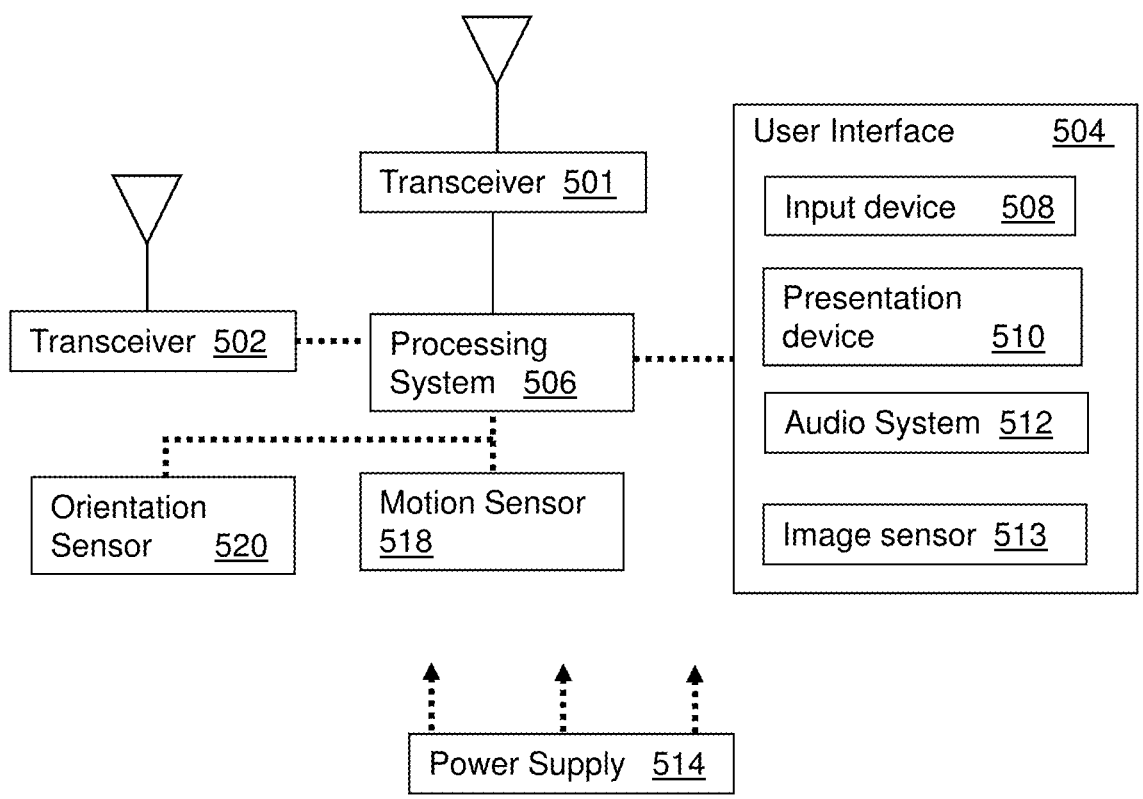
FIG. 10 is a block diagram of an example, non-limiting embodiments of a communication device in accordance with various aspects described herein.

FIG. 10 is a block diagram of an example, non-limiting embodiments of a communication device 500 in accordance with various aspects described herein. Communication device 500 can serve in whole or in part as an illustrative embodiment of a mobile tag 101 and an anchor 102, 104, 106, 108, 204 as depicted in FIGS. 1-7, and can be configured to perform portions of method 300 of FIG. 8.

In an embodiment, communication device 500 can comprise a first wireless transceivers 501, a user interface (UI) 504, a power supply 514, and a processing system 506 for managing operations of the communication device 500. In another embodiment, communication device 500 can further include a second wireless transceiver 502, a motion sensor 518, and an orientation sensor 520. The first wireless transceiver 501 can be configured to support wideband wireless signals such as ultra-wideband signals (e.g., 500 MHz) for performing precision measurements such as TDOA and TW-TOA as described above and can be further configured for exchanging messages (e.g., x-y coordinates, location flags, etc.).

The second wireless transceiver 502 can be configured to support wireless access technologies such as Bluetooth®, ZigBee®, or WiFi (Bluetooth® and ZigBee® are trademarks registered by the Bluetooth® Special Interest Group and the ZigBee® Alliance, respectively). The second wireless transceiver 502 can be utilized to conserve power and offload messaging between communication devices by utilizing narrow band signals such as Bluetooth®, ZigBee®, or WiFi, instead of ultra-wideband signals. One or both wireless transceivers 501, 502 can also be used for obtaining a strength indicator (RSSI). One or both wireless transceivers 501, 502 can also be equipped with multiple antennas and one or more phase detectors to determine angle of arrival of wireless signals and thereby an orientation of the communication device 500 (e.g., mobile tag 101) relative to another communication device 500 (e.g., anchor 204).

The UI 504 can include an input device 508 that provides at least one of one or more depressible buttons, a tactile keypad, a touch-sensitive keypad, or a navigation mechanism such as a roller ball, a joystick, or a navigation disk for manipulating operations of the communication device 500. The input device 508 can be an integral part of a housing assembly of the communication device 500 or an independent device operably coupled thereto by a tethered wireline interface (such as a USB cable) or a wireless interface supporting for example Bluetooth®. The UI 504 can further include a presentation device 510. The presentation device 510 can include a vibrator to generate haptic feedback, an LED (Light Emitting Diode) configurable by the processing system 506 to emit one or more colors, and/or a monochrome or color LCD (Liquid Crystal Display) or OLED (Organic LED) display configurable by the processing system to present alphanumeric characters, icons or other displayable objects.

The UI 504 can also include an audio system 512 that utilizes audio technology for conveying low volume audio (for proximity listening by a user) and/or high volume audio (for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images in a vicinity of the communication device 500. The camera can be used for performing facial recognition and user ID recognition that can be combined with embodiments of the subject disclosure.

The power supply 514 can utilize common power management technologies such as replaceable and rechargeable batteries, supply regulation technologies, and/or charging system technologies for supplying energy to the components of the communication device 500 to facilitate portable applications. Alternatively, or in combination, the charging system can utilize external power sources such as DC power supplied over a physical interface such as a USB port or other suitable tethering technologies.

The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (in degrees, minutes, or other suitable orientation metrics). In some embodiments, the orientation sensor 520 can replace a need for utilizing multiple antennas with the first and/or second wireless transceivers 501, 502 and a phase detector for performing angle of arrival measurements. In other embodiments, the function of the orientation sensor 520 can be combined with an angle of arrival measurement performed with multiple antennas with the first and/or second wireless transceivers 501, 502 and a phase detector.

The processing system 506 can utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 10 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings.

The communication device 500 as described herein can operate with more or less of the circuit components shown in FIG. 10. These variant embodiments can be used in one or more embodiments of the subject disclosure.

Figure 11:
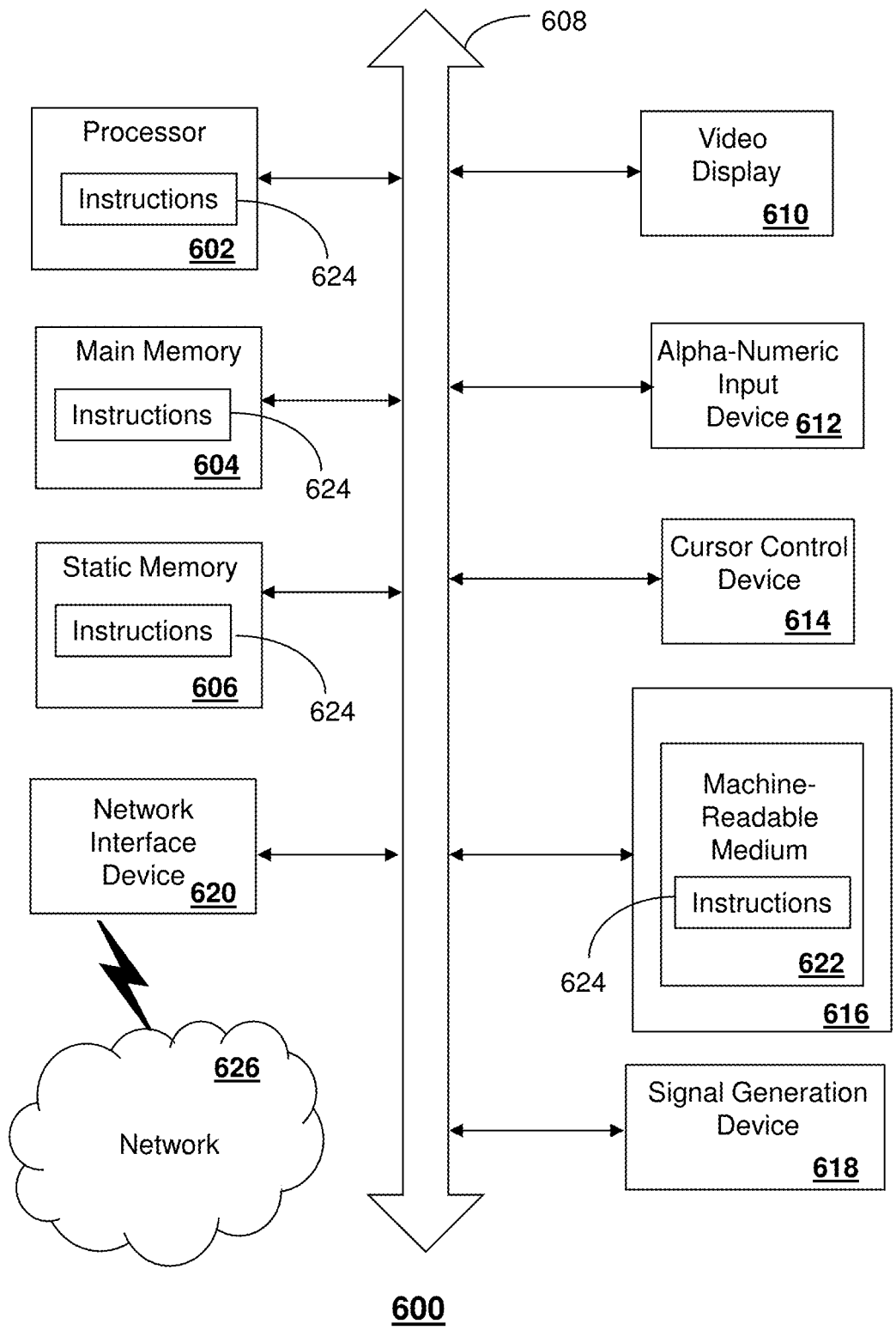
FIG. 11 is a block diagram of an example, non-limiting embodiments of a computing system in accordance with various aspects described herein.

FIG. 11 depicts an exemplary diagrammatic representation of a machine in the form of a computing system 600 within which a set of instructions, when executed, may cause the machine to perform any one or more of the methods described above. One or more instances of the machine can operate, for example, as the computing system referred to in method 300 of FIG. 8. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Figure 12:
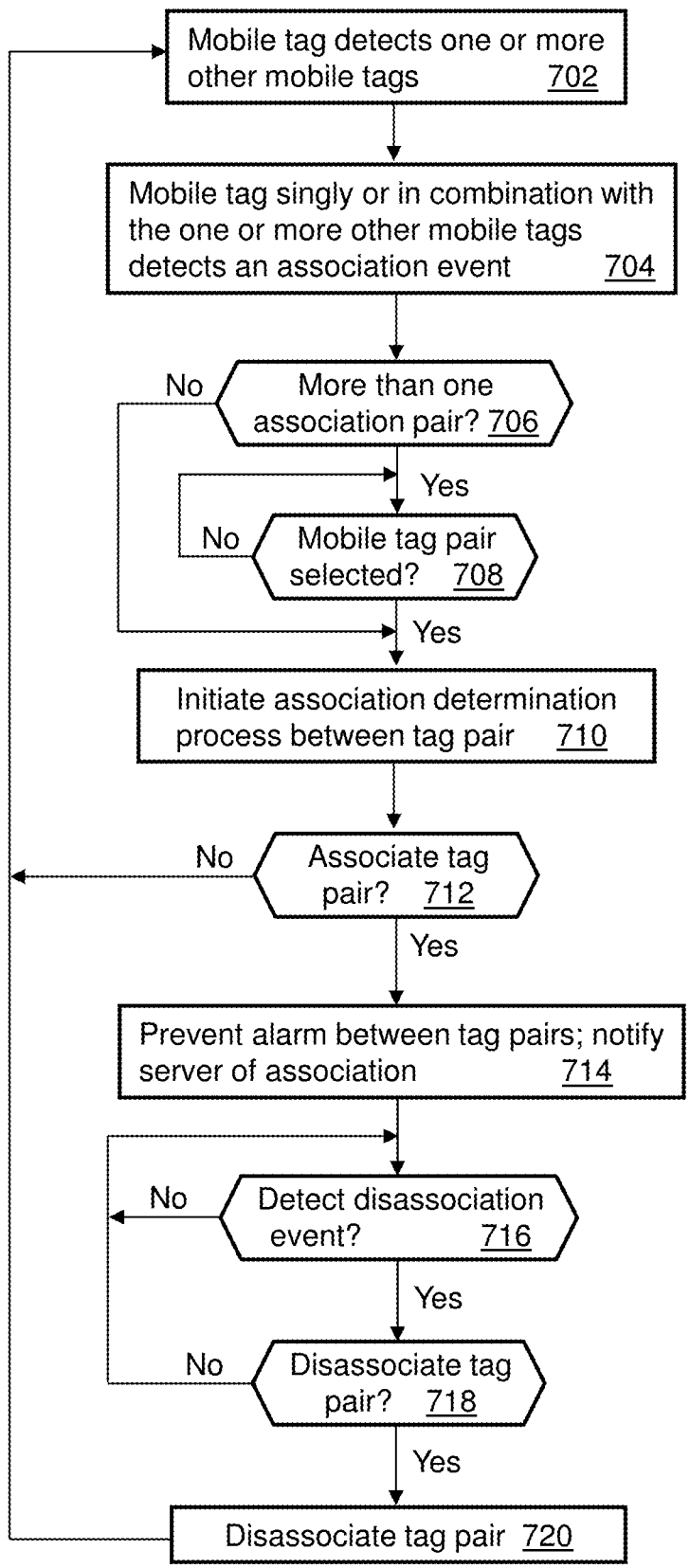
FIG. 12 depicts an illustrative embodiment of a method for determining whether to associate or disassociate mobile tags in accordance with various aspects described herein.

FIG. 12 depicts an illustrative embodiment of a method 700 for determining whether to associate or disassociate mobile tags in accordance with various aspects described herein. Method 700 can be applied to the environment of the mobile tags 201 shown in FIG. 7. For instance, a mobile tag 201 can be coupled to a vehicle (e.g., a forklift) that can be controlled by a user who also carries a mobile tag 201. Method 700 can also be utilized to distinguish a mitigation event such as described in method 300 at step 312 (e.g., collision avoidance) from an association event as will be described below. Method 700 also provides a process for identifying a disassociation event for disassociating mobile tags 201 that were previously associated with each other.

It will be appreciated that the method 700 is not limited to the use case of FIG. 7. Method 700 can be applied to other use cases, including without limitation, a parking lot for managing parking spots (e.g., valet service), a commercial or retail environment for monitoring individuals and/or assets (e.g., individuals tasked to distribute assets by hand or other equipment), assisted navigation of vehicles and/or machinery such as robots or forklifts (e.g., use or maintenance of machinery), as well as other suitable applications for which the subject disclosure can be applied to.

Figure 13A:
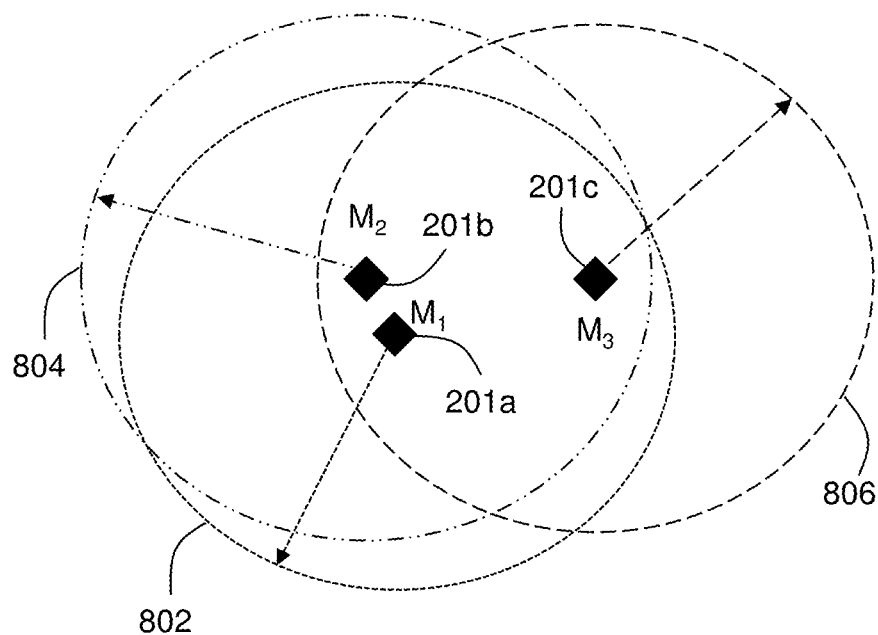
FIGS. 13A, 13B and 13C are block diagrams illustrating exemplary, non-limiting embodiments of use cases for associating and/or disassociating mobile tags in accordance with various aspects described herein.

With this in mind, method 700 can begin at step 702 where mobile tags 201a-201c detect each other in their respective coverage areas 802, 804, 806 as depicted in FIG. 13A (e.g., mobile tags $M_1$, $M_2$, $M_3$). As noted in step 308 of FIG. 8, mobile tags 201 can be configured to share location information with a server, anchors and/or each other. At step 702, mobile tags 201a-201c can be further configured to share each other's locations. Sharing location information among mobile tags 201a-201c enables the mobile tags 201a-201c to determine their respective distances among each other, their respective movement among each other, and/or their respective trajectories among each other, which can be used by the mobile tags 201a-201c to distinguish an association event at step 704 from a mitigation event (such as a collision).

In another embodiment, the mobile tags 201a-201c can also be configured to exchange messages indicating the use case for these mobile tags 201a-201c. For example, mobile tag 201a can be configured to send a message to the other mobile tags 201b-201c indicating it is being carried by an individual, while mobile tags 201b-201c can send messages to each other and mobile tag 201a indicating mobile tags 201b-201c are being carried by a vehicle such as a forklift, which can be driven the individual carrying mobile tag 201a for asset placement and relocation in the demarcated area 200 of FIG. 7.

The exchange of messages between mobile tags 201a-201c can further indicate an identity of the individual carrying mobile tag 201a, a status of the mobile tags 201b-201c such as, for example, whether the vehicles, respectively, coupled to mobile tags 201b-201c are available for use. As a precautionary measure mobile tags 201b-201c can be further configured to communicate with a server (discussed in relation to FIGS. 7-8) via gateway anchors 208 to determine whether the individual identified by mobile tag 201a is authorized to use the vehicles coupled to mobile tags 201b-201c, respectively. Upon receiving confirmation that the individual is authorized, for example, to utilize either vehicle coupled to mobile tags 201b-201c, mobile tags 201b-201c can be configured to send a message to mobile tag 201a indicating the individual is authorized to use such vehicles. If the individual carrying mobile tag 201a is not authorized to use either vehicle, mobile tags 201b-201c can be configured to send a message mobile tag 201a indicating this determination. It will be appreciate that, alternatively, mobile tags 201b-201c can be configured with look-up tables, respectively, to track authorized users of each vehicle and perform the foregoing verification without communicating with the server.

Since the above exchange of messages between mobile tags 201a-201c is not related to TDOA and/or TW-TOA measurements, mobile tags 201a-201c can be configured to utilize narrowband signaling technology (e.g., Bluetooth®) to perform such communications and to conserve more power than utilizing wideband signaling technology.

Based on the above information, the mobile tags 201a-201c can be configured to detect at step 704 an association event versus a mitigation event. In the case of a mitigation event, the mobile tags 201a-201c can be configured to determine whether they are in motion or stationary. If in motion, mobile tags 201a-201c can determine whether such movements can result in a collision based on the respective trajectory of the mobile tags 201a-201c. If, on the other hand, mobile tag 201a detects that one or both of mobile tags 201b-201c are not in motion (e.g., stationary) and/or mobile tags 201b-201c have indicated by wireless messages that their respective vehicles are available for use, then mobile tags 201a-201c can be configured to detect an association event is present at step 704 rather than a mitigation event.

For illustration purposes only, assume mobile tags 201b-201c are both coupled to vehicles available for use by the individual carrying mobile tag 201a. In this use case, mobile tags 201a-201c can be configured to detect this condition at step 706 based on an exchange of one or more of the messages described above and/or motion tracking by the mobile tags 201a-201c. Since both vehicles are available for use by the individual, the individual must be made aware that both vehicles are available for use. To achieve this notification, the association event detected at step 704 in association with both vehicles can be communicated to the individual visually and/or audibly at step 706. For example, mobile tags 201a-201c can be configured with a user interface 504 depicted in FIG. 10. The user interface 504 can be configured to illuminate an LED of the visual device 510 of mobile tags 201a-201c and strobe a color of light indicating an association event (e.g., strobing the color yellow). The strobing rate of the mobile tags 201a-201c can begin at a same frequency (e.g., 2 Hz) to indicate to the individual carrying mobile tag 201a of the possible association options with the vehicles of mobile tags 201b-201c.

To select an association, the individual can utilize a button of input device 508 of mobile tag 201a to select between the vehicles of mobile tags 201b-201c, respectively. For example, the individual can depress twice the button of the input device 508 of mobile tag 201a to identify an interest in associating with one of the vehicles of mobile tags 201b-201c. This depression can be conveyed to mobile tags 201b-201c via wireless messages. Upon receiving a wireless message from mobile tag 201a, mobile tag 201b can increase the strobe the LED to a faster rate (e.g., 5 Hz), while the LED of mobile tag 201c strobes its LED at a lower rate (e.g., 2 Hz). Repeating the double depression of the button of mobile tag 201a results in mobile tag 201a to transmit a new wireless message that causes mobile tag 201c to strobe its LED faster (e.g., 5 Hz), while mobile tag 201b strobes its LED at a lower rate (e.g., 2 Hz). The faster strobing of the LED of mobile tag 201b can indicate to the individual of mobile tag 201a that the vehicle associated with mobile tag 201b is ready to be associated with the mobile tag 201a of the individual, while mobile tag 201c with the slower strobe rate of its LED indicates to the individual the vehicle associated with mobile tag 201c is on standby for an association.

Figure 13B:
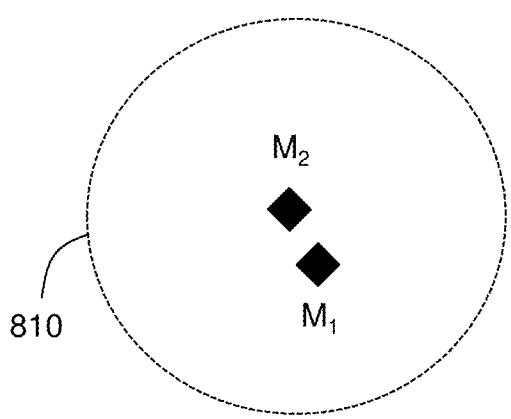

It will be appreciated that the transmission of a message by mobile tag 201a that causes the toggling effect described above between mobile tags 201b-201c can be performed by other user-generated input provided by the individual (e.g., speech detected by a microphone of audio system 512 of mobile tag 201a). Alternatively, the mobile tags 201b-201c can be configured to detect speech of the individual via a microphone of audio system 512 of mobile tags 201b, 201c, and perform the toggling effect described above without needing to receive a wireless message from the mobile tag 201a of the individual. It will be further appreciated that one of the mobile tags 201b-201c can be configured to automatically strobe its LED at the higher rate (e.g., 5 Hz) based on which of the mobile tags 201b-201c is closest to the mobile tag 201a carried by the individual (e.g., mobile tags 201a-201b as depicted in FIGS. 13A-13B). Additionally, mobile tags 201b-201c can be configured to inform each other via a wireless message exchange as to which of mobile tags 201b-201c has determined it is closest to mobile tag 201a.

The individual carrying mobile tag 201a can select an association to one of mobile tags 201b-201c by utilizing a different button depression technique (e.g., depress button continuously for 2.5 seconds). For instance, suppose the individual carrying mobile tag 201a chooses to select the vehicle coupled to mobile tag 201b. Upon depressing the button of mobile tag 201a continuously for 2.5 seconds, mobile tag 201a can transmit a wireless message to mobile tag 201b to initiate at step 710 an association determination process by changing the LED illumination from a strobing illumination to a continuous color (e.g., light green). Similarly, the LED of mobile tag 201a can also be illuminated to the same continuous color at step 710. These actions at step 710 can indicate to the individual that an association has been initiated between the mobile tag 201a of the individual and the mobile tag 201b of the vehicle. It will be appreciated that in an embodiment, mobile tags 201b-201c can be configured to automatically change the LED illumination from a strobing illumination to a continuous color (e.g., light green) upon detecting that the mobile tags 201b-201c are in close proximity to each other or crossed a distance threshold (e.g., 1 meter from each other).

Upon the individual turning on the vehicle carrying mobile tag 201b via an ignition key, the LED of mobile tag 201b can change to a brighter and darker green color. The mobile tag 201b can be configured to communicate the change in the LED illumination to mobile tag 201a via a wireless message, thereby causing mobile tag 201a to perform the same change with its LED illumination. This ends the association determination process at step 710 for mobile tags 201a-201b and enables the mobile tags 201a-201b to identify an association state at step 712. This also provides other individuals roaming the demarcated area 200 of FIG. 7 an indication of an association between the individual carrying mobile tag 201a and the vehicle carrying mobile tag 201b. To prevent a false alarm assertion, mobile tags 201a-201b can be configured at step 714 to disable an alarm state (e.g., audible, visual and/or tactile alarm) from being asserted based on the close proximity of mobile tags 201a-201b to each other. Although alarm conditions may be disabled between mobile tags 201a-201b while they are collocated and associated with each other, mobile tags 201a-201b can be configured to continue monitoring the location of other mobile tags 201 to determine if a mitigation event has occurred as described by step 312 of FIG. 8, and assert an alarm when a mitigation event is detected (e.g., potential collision).

Additionally, mobile tag 201a and/or mobile tag 201b can be configured at step 714 to inform mobile tag 201c and/or the server (via a gateway anchor 208) of this association via a wireless message transmitted by mobile tag 201a and/or mobile tag 201b. Alternatively, mobile tag 201c can be configured to assert a timer when the association event was detected at step 704 having a duration of, for example 2 minutes. After the timer expires and/or the mobile tag 201c receives a wireless message from mobile tag 201a and/or mobile tag 201b of the association, mobile tag 201c can in turn disable the illumination of its LED to indicate to other individuals roaming the demarcated area 200 of FIG. 7 that the vehicle associated with mobile tag 201c is available for use.

The server can over time association information from mobile tags 201 performing the above process to monitor individuals utilizing vehicles in the demarcated area 200 of FIG. 7.

Figure 13C:
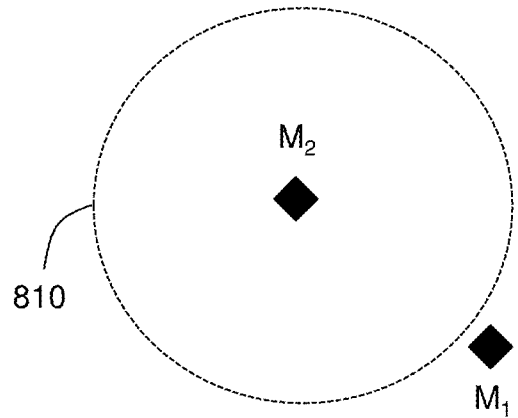

Once mobile tags 201a-201b have been associated, one or both mobile tags 201a-201b can be configured at step 716 to establish a perimeter 810 depicted in FIGS. 13B and 13C to detect a disassociation event. At step 716 mobile tags 201a-201b can be further configured to periodically monitor their respective locations utilizing the TDOA or TW-TOA measurement techniques described earlier and share the location information with each other via an exchange of wireless messages. Perimeter 810 can serve as a distance threshold (e.g., 3 meters) from which mobile tags 201a-201b can operate without invoking a disassociation event. A disassociation event can represent a circumstance in which association of the mobile tags 201a-201b may no longer desirable. For example, if the individual carrying mobile tag 201a is no longer controlling or occupying the vehicle associated with mobile tag 201b because the individual has decided to initiate a lunch break that is too far removed from the vehicle, then the mobile tags 201a-201b can be configured to detect this change in circumstances due to the mobile tag 201a of the individual leaving the perimeter 810 as shown in FIG. 13C. Upon detecting an distance between mobile tags 201a-201b that exceeds the perimeter 810, one or both mobile tags 201a-201b can be configured to initiate a disassociation determination process. The disassociation determination process can lead to disassociation of mobile tags 201a-201b, which in turn enables other individuals with other mobile tags 201 to make use of the vehicle associated with mobile tag 201b; thus, increasing the overall efficiency of equipment usage in the demarcated area 200 of FIG. 7.

Additionally, the above association and disassociation processes can be used to prevent unauthorized users to make use of the vehicle associated with mobile tags 201b at the consent of the individual of mobile tag 201a. For example, once mobile tags 201a-201b are associated with each other, another user with a different mobile tag (e.g., mobile tag 201d, not shown) cannot take control of the vehicle associated with mobile tag 201b because once the distance between mobile tag 201a exceeds the perimeter 810, a disassociation determination process is invoked which can lead to a disassociation between mobile tags 201a-201b. When such a disassociation occurs between mobile tags 201a-201b, the association process started at step 702 that leads to the association determination process at step 710 must be reinitiated, which as described earlier will not allow associations between unauthorized users and the vehicle. The association and disassociation process can also prevent the individual carrying mobile tag 201a from associating him/herself with more than one vehicle at a time, thereby preventing an excess logging of vehicle time usage.

Referring back to step 716, mobile tags 201a-201b can be configured to detect when mobile tag 201a is outside the distance threshold associated with perimeter 810. This determination can be performed by the mobile tags 201a-201b periodically sharing location information with each other via an exchange of wireless messages. Upon detecting this change in location of mobile tag 201a, one or both mobile tags 201a-201b can be configured to initiate a timer (e.g., 1 minute) to provide the individual carrying the mobile tag 201a time to return to the inner bounds of the perimeter 810. Upon initiating the timer, the mobile tag 201a can be configured to provide a visual, audible or tactile indication (e.g., flashing LED of a certain color, e.g., amber; synthesized voice warning to user, and/or vibration of the mobile tag 201*a*) that notifies the individual that s/he has moved away from the vehicle associated with mobile tag 201*b* beyond a desirable area of operation (i.e., perimeter 810). The mobile tag 201*b* associated with the vehicle can also be configured to provide a similar visual and/or audible alert.

If the timer expires before the individual returns within perimeter 810, the mobile tags 201*a*-201*b* can be configured at step 718 to detect this state and disassociate from each other at step 720. The disassociation can be communicated visually to others individuals in the demarcated area 200 based on the mobile tags 201*a*-201*b* changing their respective LEDs from a continuous dark green color to an "off state" with no illumination. Upon initiating a disassociation at step 720, the one or both mobile tags 201*a*-201*b* can be further configured to notify the server of this disassociation via a gateway anchor 208. In an embodiment, if the individual is aware that the mobile tag 201*a* has a 1 minute timer, and the individual needs more time, the mobile tag 201*a* can be configured to detect an extension request via user-generated input detected by the user interface 504 of the mobile tag 201*a* (e.g., certain button depression technique, e.g., 3 rapid depressions of a button; speech command detected with speech recognition, etc.). Upon detecting the request, mobile tag 201*a* can be configured to communicate this request wirelessly to mobile tag 201*b* if it within the coverage area of mobile tag 201*b*, or via a gateway anchor 208. To avoid misuse of an extension request, mobile tags 201*a*-201*b* can be configured to allow no more than a certain number of extension requests (e.g., a limit of 3 extension requests).

It will be appreciated that method 700 can be adapted to accommodate other embodiments contemplated by the subject disclosure. For example, the order in which mobile tags 201 perform method 700 can be reversed in any order in whole or in part between the mobile tags performing steps 702-720.

While for purposes of simplicity of explanation, the respective processes are shown and described as a series of blocks in FIG. 12, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, referring back to step 706, if only a single pair of mobile tags 201 can be associated with each other, step 708 may not be necessary since a user of the mobile tag 201 will have a single choice.

One or more aspects of the subject disclosure include a first mobile tag, comprising a processing system including a processor, and a memory that stores executable instructions that, when executed by the processing system, facilitate performance of operations. The operations can include determining first location information of the first mobile tag according to a location determination process initiated with at least one anchor, wirelessly receiving second location information from a second mobile tag, detecting an association event between the first mobile tag and the second mobile tag based on a comparison of the first location information and the second location information, initiating an indication at the first mobile tag representing the association event, and determining whether to associate the first mobile tag and the second mobile tag based on an association determination process initiated between the first mobile tag and the second mobile tag.

One or more aspects of the subject disclosure include a method for determining, by a processing system of a first mobile tag, a location of the first mobile tag via communications with at least one anchor, receiving, by the processing system, a plurality of locations from a plurality of mobile tags, detecting, by the processing system, an association event between the first mobile tag and the plurality of mobile tags based on a comparison of the location of the first mobile tag and the plurality of locations of the plurality of mobile tags, and responsive to the detecting the association event, determining whether to associate the first mobile tag with a second mobile tag identified from the plurality of mobile tags based on an association determination process initiated between the first mobile tag and the plurality of mobile tags.

One or more aspects of the subject disclosure include a machine-readable medium comprising executable instructions that, when executed by a processing system including a processor, facilitate performance of operations. The machine-readable medium and the processing system can be operated from a first mobile tag, and the operations of the processing system can include obtaining a location of a first mobile tag, responsive to detecting a second mobile tag crossing a threshold relative to the location of the first mobile tag, determining according to an activity associated with the first mobile tag, the second mobile tag, or both whether there is an association event between the first mobile tag and the second mobile tag, and responsive to determining the activity corresponds to the association event, determining whether to associate the first mobile tag and the second mobile tag.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A first mobile tag, comprising:
a processing system including a processor; and
a memory that stores executable instructions that, when executed by the processing system, facilitate performance of operations, the operations comprising:
determining first location information of the first mobile tag according to a location determination process initiated with at least one anchor;

wirelessly receiving second location information for a second mobile tag;

detecting an association event between the first mobile tag and the second mobile tag based on a comparison of proximity of the first location information and the second location information;

initiating an indication at the first mobile tag representing detection of the association event, wherein the indication comprises a visual, audible or tactile indication; and determining whether to associate the first mobile tag and the second mobile tag based on an association determination process initiated between the first mobile tag and the second mobile tag responsive to the association event.

2. The first mobile tag of claim 1, wherein the detecting the association event comprises:

calculating a distance between the first mobile tag and the second mobile tag based on the first location information and the second location information; and determining that the distance is below a distance threshold.

3. The first mobile tag of claim 1, wherein the detecting the association event comprises determining that the first mobile tag and the second mobile tag are not affected by a mitigation event.

4. The first mobile tag of claim 1, wherein the second mobile tag is coupled to a vehicle, and wherein the detecting the association event comprises determining that the vehicle is stationary.

5. The first mobile tag of claim 1, wherein the operations further comprise associating the first mobile tag with the second mobile tag responsive to receiving user-generated input during the association determination process.

6. The first mobile tag of claim 5, wherein the user-generated input indicating the first mobile tag is to be associated with the second mobile tag.

7. The first mobile tag of claim 6, wherein the user-generated input is generated at the first mobile tag or the second mobile tag.

8. The first mobile tag of claim 5, wherein the operations further comprise transmitting a wireless message to a server, the wireless message indicating the first mobile tag and the second mobile tag have been associated.

9. The first mobile tag of claim 5, wherein the operations further comprise detecting a disassociation event.

10. The first mobile tag of claim 9, wherein the detecting the disassociation event is responsive to detecting a distance between the first mobile tag and the second mobile tag that exceeds a distance threshold.

11. The first mobile tag of claim 9, wherein the operations further comprise asserting an alarm at the first mobile tag or the second mobile tag to indicate the disassociation event, wherein the alarm is audible, visual, tactile or combinations thereof.

12. The first mobile tag of claim 9, wherein the operations further comprise disassociating the first mobile tag and the second mobile tag responsive to expiration of a timer, wherein the disassociating prevents a user of the first mobile tag to delegate an association between a third mobile tag and the second mobile tag.

13. The first mobile tag of claim 10, wherein the operations further comprise preventing a disassociation between the first mobile tag and the second mobile tag responsive to receiving user-generated input requesting an extension of an association between the first mobile tag and the second mobile tag, or calculating an update to the distance between the first mobile tag and the second mobile tag resulting in an updated distance that no longer exceeds the distance threshold.

14. The first mobile tag of claim 1, wherein the operations further comprise wirelessly receiving third location information from a third mobile tag, wherein the association event is based on a first possible association between the first mobile tag and the second mobile tag or a second possible association between the first mobile tag and the third mobile tag, and wherein the determining whether to associate the first mobile tag and the second mobile tag further includes determining whether to associate the first mobile tag and the third mobile tag.

15. The first mobile tag of claim 14, wherein the operations further comprise associating the first mobile tag and the second mobile tag responsive to receiving a selection requesting the first possible association.

16. The first mobile tag of claim 1, wherein the determining the first location information is performed according to a processing of wideband signals processed by the first mobile tag, and wherein the second location information is received over a narrowband signal.

17. A method, comprising:

determining, by a processing system of a first mobile tag, a location of the first mobile tag via communications with at least one device;

receiving, by the processing system, a plurality of locations from a plurality of mobile tags;

detecting, by the processing system, an association event between the first mobile tag and the plurality of mobile tags based on a comparison of the location of the first mobile tag and the plurality of locations of the plurality of mobile tags; and responsive to the detecting the association event, determining whether to associate the first mobile tag with a second mobile tag identified from the plurality of mobile tags based on an association determination process initiated between the first mobile tag and the plurality of mobile tags.

18. The method of claim 17, wherein the at least one device comprises at least one anchor or at least one other mobile tag, and where the method further comprises, responsive to the association determination process, associating the first mobile tag and the second mobile tag and disabling an alarm condition asserted when the first mobile tag is in close proximity to the second mobile tag.

19. A non-transitory, machine-readable medium comprising executable instructions that, when executed by a processing system including a processor, facilitate performance of operations, the machine-readable medium and the processing system operating from a first mobile tag, and the operations comprising:

obtaining a location of the first mobile tag;

responsive to detecting a second mobile tag crossing a threshold relative to the location of the first mobile tag, determining according to an activity associated with the first mobile tag, the second mobile tag, or both whether there is an association event between the first mobile tag and the second mobile tag; and responsive to determining the activity corresponds to the association event, determining whether to associate the first mobile tag and the second mobile tag.

20. The non-transitory, machine-readable medium of claim 19, wherein the activity comprises a first status of the first mobile tag, a second status of the second mobile tag, or any combinations thereof, and wherein the location of the first mobile tag is determined by the first mobile tag by performing a distance calculation relative to the second mobile tag.

\* \* \* \* \*

UNITED STATES PATENT AND TRADEMARK OFFICE
CERTIFICATE OF CORRECTION

| | |
|---|---|
| PATENT NO. | : 11,259,143 B2 |
| APPLICATION NO. | : 16/937852 |
| DATED | : February 22, 2022 |
| INVENTOR(S) | : Duan et al. |

Page 1 of 1

It is certified that error appears in the above-identified patent and that said Letters Patent is hereby corrected as shown below:

On the Title Page

Item (72), Lines 8 and 9:
Alexey Liushnia address, --Kharkov-- should be "Kharkiv".
Dmitry Zvegincev address, --Kharkov-- should be "Kharkiv".

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*